United States Patent [19]
Feldman

[11] Patent Number: 6,003,302
[45] Date of Patent: Dec. 21, 1999

[54] RAMJET WITH ADJUSTABLE WORKING DUCT CASINGS

[76] Inventor: Peter Feldman, 25515 Greenfield, Apt. #101, Southfield, Mich. 48075

[ * ] Notice: This patent issued on a continued prosecution application filed under 37 CFR 1.53(d), and is subject to the twenty year patent term provisions of 35 U.S.C. 154(a)(2).

[21] Appl. No.: 08/644,375

[22] Filed: May 10, 1996

[51] Int. Cl.$^6$ ............................... F02K 7/08; F02K 7/10; F02K 1/09
[52] U.S. Cl. ........................... 60/270.1; 60/271; 244/53 B
[58] Field of Search .................... 60/270.1, 271, 60/262, 219.3; 244/53 B; 239/127.1, 265.19, 265.33

[56] References Cited

U.S. PATENT DOCUMENTS

| | | | |
|---|---|---|---|
| 2,570,629 | 10/1951 | Anxionnaz et al. | 239/265.33 |
| 2,675,670 | 4/1954 | Tenney | 60/247 |
| 2,700,515 | 1/1955 | Reder | 60/270.1 |
| 2,750,733 | 6/1956 | Paris et al. | 60/270.1 |
| 2,850,873 | 9/1958 | Hausmann | 60/270.1 |
| 2,955,414 | 10/1960 | Hausmann | 60/270.1 |
| 3,044,258 | 7/1962 | Carlton | 239/265.33 |
| 3,066,480 | 12/1962 | Buck | 60/270.1 |
| 3,176,462 | 4/1965 | Eckert | 60/270.1 |
| 3,296,800 | 1/1967 | Keenan et al. | 60/270.1 |
| 3,374,631 | 3/1968 | Marks | 239/265.19 |
| 3,974,648 | 8/1976 | Kepler | 60/270.1 |
| 4,291,533 | 9/1981 | Dugger et al. | 60/270.1 |
| 4,628,688 | 12/1986 | Keirsey | 60/270.1 |
| 5,058,377 | 10/1991 | Wildner | 60/270.1 |
| 5,105,615 | 4/1992 | Herzog | 60/270.1 |
| 5,191,761 | 3/1993 | Janeke | 60/270.1 |

*Primary Examiner*—Ted Kim

[57] ABSTRACT

A ramjet having an annular working duct (10) which is formed by outer (15) and inner (20) tubular casings. The duct (10) is adjustable by the longitudinal displacement of inner casing (20) along outer casing (15).

2 Claims, 1 Drawing Sheet

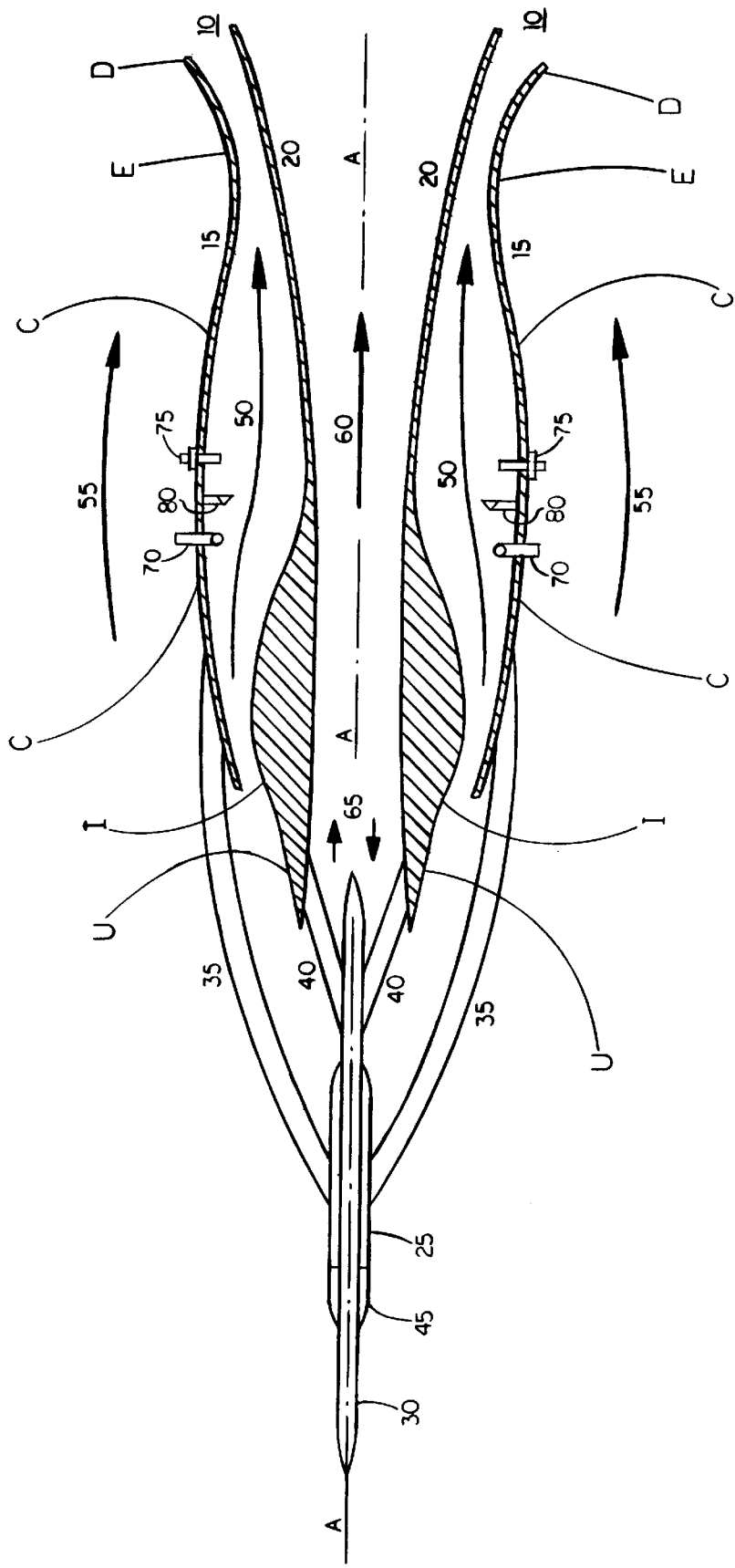

RAMJET WITH ADJUSTABLE WORKING DUCT CASINGS

This invention concerns ramjets, more particularly, a ramjet with variable geometry of working duct.

The merits of ramjets engines are well known. But each specific model of up to date ramjets is efficient only within a certain narrow range of speeds, or flight Mach numbers.

Therefore, an object of the present invention is a ramjet efficient in the wide range of speeds.

The working duct of this ramjet would be to the high extent adjustable and have an effective cooling.

The problem to be solved is accomplished in that the working duct of the ramjet is annular, formed by outer and inner tubular casings. So, the working process of the ramjet occurs within the annular space confined between the outer and the inner casings. The casings are cooled by atmospheric air flowing accordingly about the outer casing and through the inner casing. The duct is geometrically adjustable by the relative longitudinal displacement of the outer and the inner casings one along another.

The ramjet engine of the present invention can possess significant employments as a propulsion power plant for the speeds of flight from moderate subsonic to high supersonic. Among those employments are high-speed and high-altitude aircrafts, launch orbital systems, and missiles.

A typical embodiment of the ramjet of the present invention is schematically depicted in the accompanying drawing which is a longitudinal cross-sectional view.

An annular working duct 10 of the ramjet has asymmetrical outer 15 and inner 20 tubular casings. The named casings 15 and 20 are arranged concentrically on a longitudinal geometric axis A, so inner casing 20 is spaced within outer casing 15. A gas flow of working process (an intake of air, a combustion of fuel, and an exhaust of combustion products—all shown by arrowhead lines 50) takes place within the annular space confined between outer 15 and inner 20 casings. An airflow about outer 15 and through inner 20 casings (respectively arrowhead lines 55 and 60) cools accordingly outer 15 and inner 20 casings. Duct 10 has an upstream end U and a downstream end D. At upstream end U is defined a leading portion I of duct 10. At downstream end D is defined a trailing portion E of duct 10. Between leading I and trailing E portions is defined a mid portion C of duct 10. Leading portion I forms an inlet for the air flowing into the annular space. Mid portion C forms a combustor for the fuel combustion therein. Trailing portion E forms an exhaust nozzle for the outlet of combustion products flowing out of the annular space. In combustor C there are fuel injector orifices 70 and downstream from orifices 70—igniting devices 75 and flame holders 80, accordingly to bring fuel into combustor C and ignite air-fuel mixture and support stability of combustion therein. All portions of duct 10 are entirely adjustable geometrically by the axial displacement of inner casing 20 along outer casing 15.

To outer casing 15 by a number of primary struts 35 is rigidly connected a longitudinal sleeve 25. Sleeve 25 is arranged around axis A and positioned upstream to from inner casing 20. To inner casing 20 by a number of secondary struts 40 is rigidly connected a longitudinal stem 30. Stem 30 is installed in sleeve 25 for axial reciprocation, so as needed for the displacement of inner casing 20, necessary for the adjustment of the portions of duct 10. To perform the reciprocation of stem 30 in sleeve 25, the ramjet is provided with a reciprocating means 45 (shown conventionally). Arrows 65 show the reciprocation of stem 30 and the displacement of inner casing 20, corresponding to the adjustment of the portions of duct 10.

The ramjet is provided with fuel injectors 70 for injection fuel in the annular space, igniting devices 75 to ignite air-fuel mixture, and flame holders 80 to support stability of combustion.

The scope of the invention should not be limited by the example given in the description above, but rather, determined by the appended claims.

Having described here the invention in a manner clear to those skilled in the art, I claim:

1. A ramjet having an annular working duct, said duct is formed by outer and inner tubular casings, said casings are arranged around a longitudinal geometric axis such that said inner casing is spaced within said outer casing, said ramjet having an annular space confined between said outer and said inner casings;

said annular space including:

an inlet for atmospheric air that flows into said annular space, a combustor for fuel combustion therein, and an exhaust nozzle for outlet of combustion products flowing out of said annular space;

said casings are cooled by an atmospheric air that flows accordingly about said outer and through said inner casings;

said duct having an upstream end and a downstream end, at said upstream end is defined a leading portion of said duct, at said downstream end is defined a trailing portion of said duct, between said leading and said trailing portions is defined a mid portion of said duct, said leading portion forming said inlet, said mid portion forming a combustor, said trailing portion forming said exhaust nozzle;

all said portions of said duct are entirely adjustable geometrically by the longitudinal displacement of said casings one relative to another;

said ramjet also comprising:

means for maintaining said inner casing spacedly within said outer casing, means for the longitudinal displacement of said casings one with respect to another, and means for introducing fuel into said combustor portion and providing combustion therein.

2. The ramjet as claimed in claim 1 in which said outer and said inner casings are substantially asymmetrical and coaxial on said longitudinal geometric axis.

* * * * *

UNITED STATES PATENT AND TRADEMARK OFFICE
CERTIFICATE OF CORRECTION

PATENT NO. : 6,003,302
DATED : December 21, 1999
INVENTOR(S) : Peter Feldman

It is certified that error appears in the above-identified patent and that said Letters Patent is hereby corrected as shown below:

Col. 1, lines 30 – 31, change 'asymmetrical' to – axisymmetrical –.

Line 33, after 'so' insert --,--.

Col. 2, line 1, delete 'to'.

Delete lines 12 to 15.

Line 19, change 'Having' to – Thus, having --.

Line 42, change 'a' to – said --.

Line 45, change 'the' to – a --.

Line 55, change 'asymmetrical' to – axisymmetrical --.

Signed and Sealed this

Twenty-first Day of November, 2000

Attest:

Q. TODD DICKINSON

*Attesting Officer*      *Director of Patents and Trademarks*